Patented Dec. 9, 1941

2,265,509

UNITED STATES PATENT OFFICE 2,265,509

PRODUCTION OF VINYL CHLORIDE

Johannes Boesler and Ernst Eberhardt, Ludwigshafen - on - the - Rhine, Wilhelm Sandhaas, Mannheim, and Robert Stadler, Heidelberg, Germany, assignors to I. G. Farbenindustrie Aktiengesellschaft, Frankfort - on - the - Main, Germany No Drawing. Application April 26, 1938, Serial No. 204,461. In Germany May 10, 1937

5 Claims. (Cl. 260—656)

The present invention relates to a process of producing vinyl chloride.

It has already been proposed to prepare vinyl chloride by leading acetylene and hydrogen chloride over active carbon. An incomplete reaction of the acetylene, however, is obtained thereby by a single passage.

It has further been proposed to use mercury salts, as for example mercury chloride which may be applied to porous carriers, such as silica gel, pumice stone or active carbon in the catalytic production of vinyl chloride from acetylene and hydrogen chloride. In this case, the initially good action of the catalysts subsides more or less rapidly so that the catalysts have to be changed or regenerated frequently.

We have now found that vinyl chloride can be obtained in a manner especially advantageous in practice by leading acetylene and hydrogen chloride at elevated temperature over active carbon while supplying mercury continuously or periodically. The acetylene used is thus converted practically quantitatively and the catalyst retains its activity unchanged. The supply of the mercury may be effected for example by applying drops of metallic mercury to the active carbon at certain intervals of time or by incorporating mercury vapor with the mixture of acetylene and hydrogen chloride periodically or continuously. For the latter purpose, for example, the gas mixture may be led over or through heated mercury, the temperature of the mercury being adjusted according to the desired degree of saturation.

Contrasted with the said known processes in which the acetylene and hydrogen chloride used must be free from impurities, the process according to this invention may, surprisingly, be carried out also with dilute acetylene, as for example that which is formed by the thermal or electrical treatment of hydrocarbons. The olefines and higher acetylene hydrocarbons contained in such acetylene do not impair the catalysts used by polymerization or resinification, contrary to expectation. On the contrary, the catalysts retain their full activity over a practically unlimited time even in the said case.

It is preferable to lead the mixture of acetylene or gas containing acetylene and the hydrogen chloride approximately in stoichiometrical ratio to the acetylene used over the active carbon at elevated temperature. The latter may also contain metallic mercury or also mercury salts, in particular the chlorides.

The vinyl chloride formed may be condensed for example by strong cooling. When using dilute acetylene, the partial pressure of the vinyl chloride is relatively small and the cooling must therefore either be very strong or the vinyl chloride absorbed by active carbon or washed out with a suitable washing agent, preferably one having a low vapor pressure, as for example tetrachlorethane or xylene. In order to avoid waste of solvent, the waste gases may be led through an absorption tower with active carbon. In the washing, not only is the vinyl chloride dissolved out, but also any hydrocarbons still present to a large extent. By subsequent fractional distillation, the said hydrocarbons, in particular ethylene, propane and the like, may be separated individually and if desired converted by thermal or electrical treatment into acetylene and then into vinyl chloride.

The following example will further illustrate the nature of this invention but the invention is not restricted to this example.

*Example*

Electric arc acetylene (containing about 16 per cent of acetylene in addition to 60 per cent of hydrogen, 4 per cent of carbon monoxide, 5 per cent of olefines and 9 per cent of saturated hydrocarbons) is led at a rate of 400 liters per hour together with hydrogen chloride gas at the rate of 70 liters per hour through a container filled with mercury at 100° C. so that the gas mixture passes along the surface of the mercury and then at 130° C. through a container containing 10 liters of active carbon. From the effluent gas, which is practically free from acetylene, the vinyl chloride is recovered for the most part by strong cooling. The last traces are absorbed by means of active carbon in a further container. The acetylene used is converted into vinyl chloride to the extent of 95 per cent. The activity of the catalyst is still unchanged after 60 days.

What we claim is:

1. In the process of producing vinyl chloride by leading acetylene and hydrogen chloride over active carbon the step which comprises supplying metallic mercury to the reactants.

2. In the process of producing vinyl chloride by leading acetylene and hydrogen chloride over active carbon the step which comprises supplying metallic mercury continuously to the reactants.

3. In the process of producing vinyl chloride by leading acetylene and hydrogen chloride over active carbon the step which comprises employing acetylene containing vapors of mercury.

4. In the process of claim 1 the step which comprises using dilute acetylene.

5. In the process of claim 1, the step which comprises using electric arc acetylene.

JOHANNES BOESLER.
ERNST EBERHARDT.
WILHELM SANDHAAS.
ROBERT STADLER.